No. 759,126. Patented May 3, 1904.

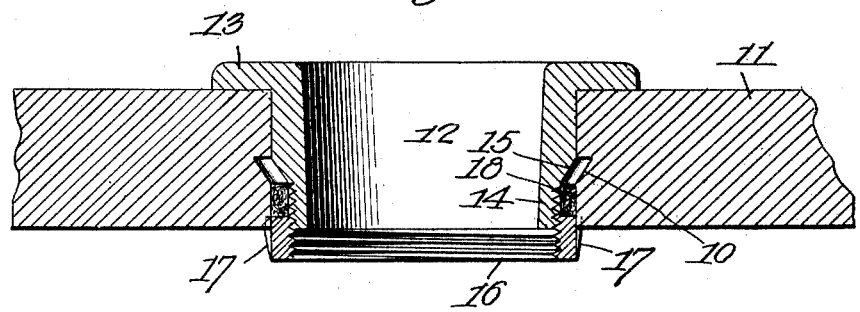
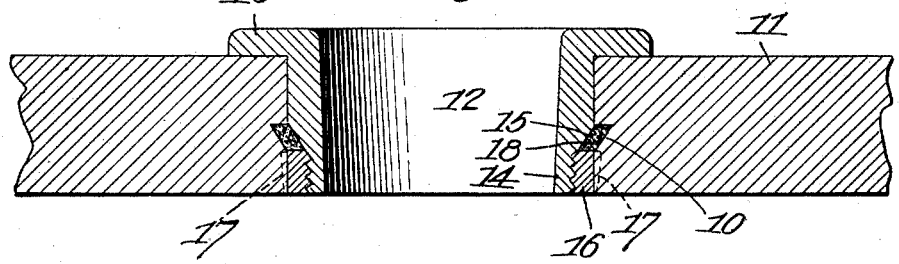
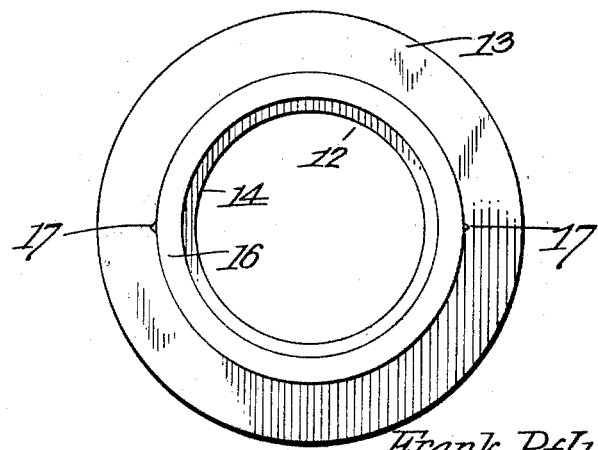

UNITED STATES PATENT OFFICE.

FRANK PFLUGER AND EMIL CHRISTENSEN, OF PORTLAND, OREGON.

BUNG-HOLE BUSHING.

SPECIFICATION forming part of Letters Patent No. 759,126, dated May 3, 1904.

Application filed August 17, 1903. Serial No. 169,809. (No model.)

*To all whom it may concern:*

Be it known that we, FRANK PFLUGER and EMIL CHRISTENSEN, citizens of the United States, residing at Portland, in the county of Multnomah and State of Oregon, have invented a new and useful Bung-Hole Bushing, of which the following is a specification.

This invention relates to the bushings of bung-holes of barrels, kegs, casks, tanks, and similar vessels wherein the bung-holes are supplied with detachable bungs, and has for its object to simplify and improve devices of this character and produce a device which may be quickly and readily applied or removed and which will be firmly locked or clamped in the bung-hole and the locking means also utilized to pack the joints and prevent leakage.

The invention consists in certain novel features of construction, as hereinafter shown and described, and specified in the claims.

In the drawings illustrative of the invention, in which corresponding parts are denoted by like designating characters, Figure 1 is a sectional view of the device, showing the parts in position prior to the closing of the locking mechanism, and Fig. 2 is a similar view with the parts closed and the "locking" action completed. Fig. 3 is a bottom plan view of the device detached.

The device may be applied to any of the various forms of barrels, kegs, casks, tanks, and the like in which bung-holes are formed and requiring detachable bungs, but is more particularly applicable to vessels employed for holding beer and similar liquids under pressure or liquids in which gas is generated, and consists in forming the bung-hole with an annular recess 10 midway between the outer and inner surfaces of the stave (represented at 11) through which the bung-hole is formed, as shown. This recess will preferably be V-shaped, with the upper side parallel with the outer and inner surfaces of the stave, as shown, but may be of any other required shape.

The bushing is represented at 12 and is formed with a lateral flange 13 at the outer end and with the inner end 14 reduced and externally threaded, whereby a shoulder 15 is formed and preferably inclined, as shown.

Engaging the threaded portion 14 is an internally-threaded clamp-ring 16, having one or more longitudinal ribs 17 upon its outer surface, as shown, and adapted to enter the wood of the member 11 and prevent the rotation of the clamp-ring. Between the inner end of the clamp-ring 16 and the shoulder 15 a packing 18 is inserted, as shown, the packing being, preferably, of lead or similar material. The recess 10, it will be observed, comes opposite the space just below the shoulder 15, so that when the bushing is screwed into the clamp-ring (which will be prevented from rotation by the spurs or ribs 17) the packing 18 will be compressed and forced outwardly into the recess 10, as shown in Fig. 2, and thus form an effectual locking means between the bushing and vessel to prevent its removal by pressure from within. The parallel form of the outer side of the recess 10 aids materially in this connection, as the resisting power of the packing is thereby greatly increased.

The packing member 18, as above noted, will preferably be of lead, which is capable of yielding under pressure to cause it to be forced outward into the recess 10, as represented; but any other substance or material or compounds of material which will accomplish the same results may be substituted for the lead without departing from the principle of the invention or sacrificing any of its advantages.

The whole device is very simple and can be cheaply constructed and readily adapted and applied and is capable of adaptation to any size or form of vessel.

The parts 12 to 16 will be of any suitable metal and may be of any size or strength required.

The recess 10 may be formed with any suitable implement either at the same time that the bung-hole is formed and trimmed or by a separate implement, as may be desired.

The device thus not only forms an effectual clamping means whereby the bung-bushing is prevented from displacement under pressure, but is likewise packed to prevent leakage between the staves and parts forming the bushing.

Having thus described the invention, what we claim is—

1. A bung-hole bushing comprising two members having threaded connection with each other, in combination with a cask having a bung-hole provided with an annular recess between its outer and inner ends, and packing material compressible between the members of the bushing and capable of expanding into said annular recess.

2. A cask having a bung-hole provided with an annular groove between its inner and outer ends, in combination with a bushing comprising two separable members, and packing material compressible between said members and expansible into said annular groove.

3. A cask having a bung-hole provided with an annular V-shaped groove having one of its edges disposed parallel to the inner and outer sides of the stave in which the bung-hole is formed, in combination with a bushing comprising separable members and a packing device compressible by said members into said V-shaped groove.

4. A cask having a bung-hole provided with an annular recess, V-shaped in cross-section, in combination with a bushing comprising two separable members, one of said members consisting of an interiorly-threaded ring having a plane upper edge and exterior means to prevent it from turning, and a ring, flanged at its outer end and having its inner end reduced to form an inclined shoulder, and an exteriorly-threaded, reduced portion below said shoulder, engaging the interiorly-threaded ring, and packing material, abutting upon the upper edge of the interiorly-threaded ring, engaging the shouldered portion of the exteriorly-threaded ring and compressed by the coaction of said rings into the V-shaped intermediate recess in the bung-hole.

In testimony that we claim the foregoing as our own we have hereto affixed our signatures in the presence of two witnesses.

FRANK PFLUGER.
EMIL CHRISTENSEN.

Witnesses:
W. B. BUELL,
M. BUCHANAN.